US010282919B2

(12) United States Patent
Joo et al.

(10) Patent No.: US 10,282,919 B2
(45) Date of Patent: May 7, 2019

(54) SYSTEM AND METHOD OF PAYING FARE OF MOBILE VEHICLE

(71) Applicant: LG CNS CO., LTD., Seoul (KR)

(72) Inventors: Jaeho Joo, Seoul (KR); Sean Kim, Seoul (KR); Rhea Kim, Seoul (KR); Tae Ho Youm, Seoul (KR)

(73) Assignee: LG CNS Co., Ltd., Seoul (KR)

( * ) Notice: Subject to any disclaimer, the term of this patent is extended or adjusted under 35 U.S.C. 154(b) by 1224 days.

(21) Appl. No.: 14/528,596

(22) Filed: Oct. 30, 2014

(65) Prior Publication Data

US 2016/0125663 A1 May 5, 2016

(51) Int. Cl.
| | | |
|---|---|---|
| *G07B 15/00* | (2011.01) | |
| *G06Q 20/04* | (2012.01) | |
| *G06Q 20/14* | (2012.01) | |
| *G06Q 20/34* | (2012.01) | |
| *G06Q 20/40* | (2012.01) | |
| *G07B 15/02* | (2011.01) | |

(52) U.S. Cl.
CPC ............ *G07B 15/00* (2013.01); *G06Q 20/045* (2013.01); *G06Q 20/145* (2013.01); *G06Q 20/34* (2013.01); *G06Q 20/342* (2013.01); *G06Q 20/40* (2013.01); *G07B 15/02* (2013.01)

(58) Field of Classification Search
CPC .... G06Q 50/30; G06Q 30/06; G06Q 30/0284; G07B 13/00; G07B 15/00; G07B 15/06; G06F 3/045; G06F 7/00
See application file for complete search history.

(56) References Cited

U.S. PATENT DOCUMENTS

| 2013/0185124 A1* | 7/2013 | Aaron | G07B 13/00 |
| | | | 705/13 |
| 2014/0074757 A1* | 3/2014 | De Gennaro | G07B 13/04 |
| | | | 705/417 |

FOREIGN PATENT DOCUMENTS

| JP | 4375621 B2 * | 12/2009 |
| KR | 10-2006-0016570 | 2/2006 |
| KR | 10-2007-0080364 | 8/2007 |

(Continued)

OTHER PUBLICATIONS

"Wireless Payment Terminals to Hit the Steets in Chicago Taxicabs," ATM & Debit News, vol. 4, pp. 1-2 (Year: 2013).*

(Continued)

*Primary Examiner* — Kevin H Flynn
*Assistant Examiner* — Brian Adams Heflin
(74) *Attorney, Agent, or Firm* — KED & Associates, LLP

(57) ABSTRACT

A method is provided of paying a fare of a mobile vehicle by using a first terminal and a second terminal. The method may include receiving, by the second terminal, fare data of the mobile vehicle, obtained from a meter based on fare calculation data that includes at least one of moving distance data and moving time data of the mobile vehicle, and transmitting the received fare data to the first terminal. The method may also include transmitting, by the first terminal, the fare data to the second terminal, and receiving, by the second terminal, card information of a passenger from a card reader, transmitting the card information to a card server connected to the second terminal through a predetermined communication network, and receiving a payment authorization of a fare of the mobile vehicle from the card server.

16 Claims, 9 Drawing Sheets

(56) References Cited

FOREIGN PATENT DOCUMENTS

| | | |
|---|---|---|
| KR | 10-2009-0098045 | 9/2009 |
| KR | 10-2011-0024979 | 3/2011 |

OTHER PUBLICATIONS

Korean Office Action dated Apr. 28, 2016 issued in Application No. 10-2015-0057833.

* cited by examiner

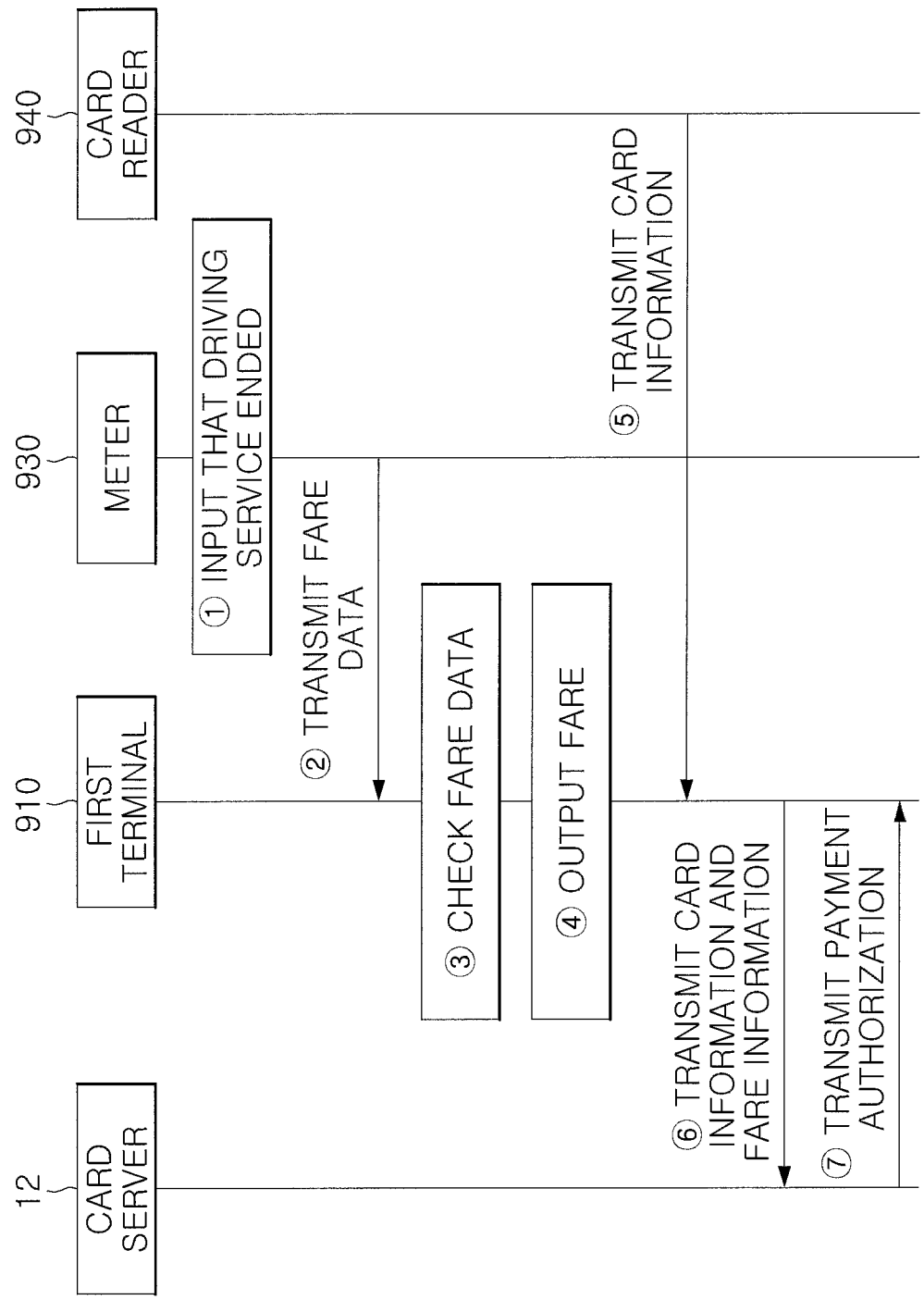

SYSTEM AND METHOD OF PAYING FARE OF MOBILE VEHICLE

BACKGROUND

1. Field

Embodiments may relate to a system and method of paying a fare of a mobile vehicle, and more particularly, to a system and method of paying a fare of a mobile vehicle that may be used to manage mobile vehicle services, to manage payment, and/or to provide convenience to a passenger.

2. Background

Public transportation, such as buses and subways, may be widely used due to low costs, whereas taxies may be widely used due to convenience and speed.

A passenger may get a taxi, tell a destination to a driver, pay a taxi fare with cash or a credit card when the taxi reaches the destination, and then get off the taxi.

Various services may be provided to the passenger for a passenger's convenience, but the passenger may still have to request the driver for a certain service. It may be difficult for the passenger to directly search for information related to a taxi service.

It may be difficult for a taxi company to manage incomes of taxies and histories of driving services of the taxies.

Accordingly, a method of efficiently managing taxies while increasing convenience of using the taxies may be desired.

BRIEF DESCRIPTION OF THE DRAWINGS

Arrangements and embodiments may be described in detail with reference to the following drawings in which like reference numerals refer to like elements and wherein:

FIG. 9 is a diagram for describing a method of paying a fare of a mobile vehicle, which is performed by a first terminal, according to an example embodiment.

DETAILED DESCRIPTION

Figure 1:
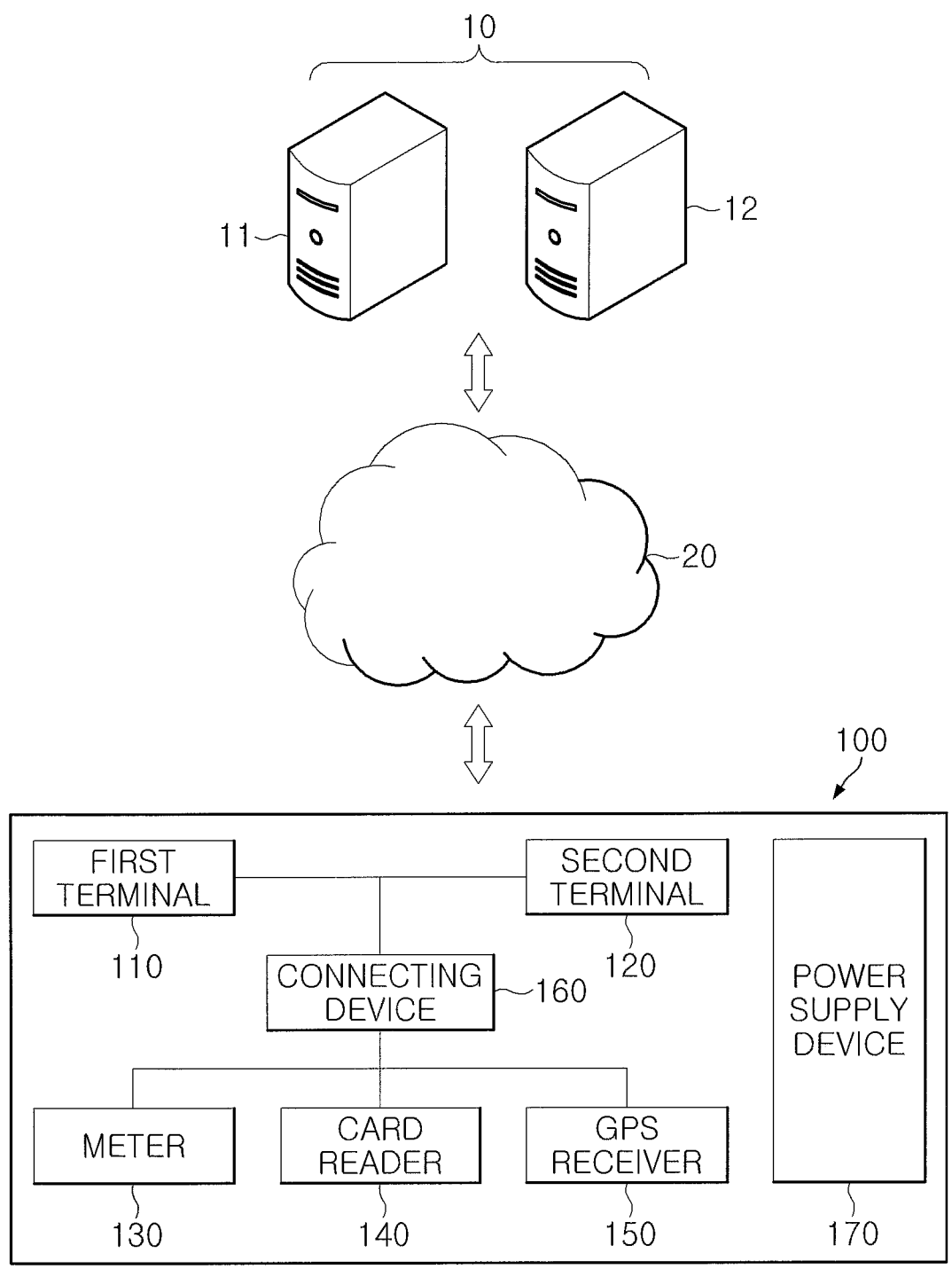
FIG. 1 is a diagram of a system for paying a fare of a mobile vehicle, according to an example embodiment.

Exemplary embodiments may be described in detail with reference to the accompanying drawings. While embodiments may be described in conjunction with exemplary embodiments thereof, it is to be understood that the present description is not intended to limit the exemplary embodiments. On the contrary, embodiments are intended to cover not only the exemplary embodiments, but also various alternatives, modifications, equivalents and other embodiments that may be included within the spirit and scope of the embodiments as defined by the appended claims. In drawings, like reference numerals may denote like elements.

According to exemplary embodiments, the word "unit" may refer to a software component or hardware component such as an FPGA or ASIC capable of carrying out a function or an operation. However, "unit" is not limited to hardware or software. A unit may be configured so as to reside in an addressable storage medium or to drive one or more processors. Units may refer to software components, object-oriented software components, class components, task components, processes, functions, attributes, procedures, subroutines, program code segments, drivers, firmware, microcode, circuits, data, databases, data structures, tables, arrays and/or variables. A function provided by a component and a unit may be a combination of smaller components and units, and may be combined with others to compose large components and units, and/or further divided into units along with other components.

In the present disclosure, 'a driving service of a mobile vehicle' may denote a service of a mobile vehicle taking on a passenger and then moving the passenger from a departure point to a destination, and may not simply denote a mobile vehicle service from a beginning to an end of business of the mobile vehicle.

FIG. 1 is a diagram of a system for paying a fare of a mobile vehicle, according to an example embodiment. Other embodiments and configurations may also be provided.

Referring to FIG. 1, a system 100 may include a first terminal 110 and a second terminal 120.

The first terminal 110 and the second terminal 120 may each be any one of various types of terminals, such as a laptop, a smart phone, a tablet personal computer (PC), and/or a personal digital assistant (PDA), which are connectable to a predetermined communication network 20.

The first and second terminals 110 and 120 may be located in a mobile vehicle, such as a taxi. The first terminal 110 may be located at a driver region of the mobile vehicle, and the second terminal 120 may be located at a passenger region of the mobile vehicle. The driver region (of the mobile vehicle) may be a front space of an internal space of the mobile vehicle, and the passenger region (of the mobile vehicle) may be a rear space of the internal space of the mobile vehicle. For example, the first terminal 110 may be located at a dash board of the mobile vehicle, and the second terminal 120 may be located at a back of a front seat, although locations of the first and second terminals 110 and 120 are not limited thereto.

A driver application for the driver may be installed (or provided) in a memory of the first terminal 110, and/or a passenger application of the passenger may be installed (or provided) in a memory of the second terminal 120. A processor of the first terminal 110 and a processor of the second terminal 120 may perform certain operations according to controls of the driver application and the passenger application, respectively.

The first and second terminals 110 and 120 may communicate with an external server 10, such as a center server 11 and a card server 12, by being connected to the external server 10 through the predetermined communication network 20.

For example, the first terminal 110 may be connected to the center server 11 through the predetermined communication network 20 to receive the driver application and the passenger application, and the first terminal 110 may transmit the passenger application to the second terminal 120. Additionally, the second terminal 120 may be connected to at least one of the center server 11 and the card server 12 through the predetermined communication network 20 to perform a process for paying a fare of the mobile vehicle.

The system 100 may further include a meter 130, a card reader 140, and a global positioning system (GPS) receiver 150, which are located in the mobile vehicle. The meter 130 may calculate a fare of the mobile vehicle based on fare calculation data that includes at least one of moving distance data and moving time data from a departure point to a destination. The card reader 140 may receive card information input by the passenger. The GPS receiver 150 may measure (or determine) a location of the mobile vehicle. The meter 130 may be located at the driver region along with the first terminal 110. The card reader 140 may be located at the passenger region along with the second terminal 120. The meter 130 may store a fare calculation program for calculating the fare of the mobile vehicle based on the fare calculation data.

At least one of the meter 130, the card reader 140, and the GPS receiver 150 may be connected to at least one of the first and second terminals 110 and 120 through a connecting device 160. At least one of the first and second terminals 110 and 120 may receive data from at least one of the meter 130, the card reader 140, and the GPS receiver 150.

A power supply device 170 may supply power to the first and second terminals 110 and 120, and may include a direct current (DC)-DC converter. For example, the power supply device 170 may transform a voltage applied from a battery of the mobile vehicle and supply the transformed voltage to the first and second terminals 110 and 120.

Operations of each component included in the system 100 may be described in detail based on a driving service of the mobile vehicle (including the system 100).

Preparing to Use System 100

In order to use the system 100, the first and second terminals 110 and 120 may be registered in the center server 11. When the first and second terminals 110 and 120 connect to the center server 11 through the predetermined communication network 20, a device number (i.e., a serial number) of each of the first and second terminals 110 and 120 may be transmitted to the center server 11 such that each of the first and second terminals 110 and 120 is registered in the center server 11.

Additionally, each of the first and second terminals 110 and 120 may transmit a device number of at least one of the meter 130, the GPS receiver 150, and the card reader 140, located in the mobile vehicle, to the center server 11 such that the at least one of the meter 130, the GPS receiver 150, and the card reader 140 is also registered in the center server 11.

Any one of the first and second terminals 110 and 120 may authorize the center server 11. For example, any one of the first and second terminals 110 and 120 may authorize the center server 11 based on an internet protocol (IP) address of the center server 11 or a certificate stored in the center server 11, thereby determining whether the center server 11 is an authentic center server.

Before driving the mobile vehicle, the driver may input login information to the first terminal 110, and the first terminal 110 may load or store driving information of the mobile vehicle with respect to the driver based on the input login information.

Taking on Passenger

When the passenger gets on the mobile vehicle and a destination is determined, the driver may manipulate the meter 130 to start a driving service, and input a rate for a fare of the mobile vehicle. The passenger may input a destination information to the second terminal 120, and the second terminal 120 may transmit the destination information to the first terminal 110. The driver may input a total number of passengers to the first terminal 110. The meter 130 may transmit data indicating that the driving service started to at least one of the first and second terminals 110 and 120.

When the driving service starts, the second terminal 120 may output prologue data, for example, video data and/or sound data, indicating that the driving service of the mobile vehicle has started.

Starting Driving Service

While driving to the destination, the driver may input a toll fee to the first terminal 110, and the first terminal 110 may reflect the toll fee (input by the driver) to the fare of the mobile vehicle.

The second terminal 120 may receive and store various types of multimedia contents from the center server 11. The passenger may manipulate the second terminal 120 to reproduce multimedia content stored in the second terminal 120. Examples of the multimedia contents may include not only video data (such as movies, television (TV) series, music videos), but also audio data (such as songs). The passenger may check weather or look at a map through the second terminal 120. The passenger may also check whether the mobile vehicle is currently located on the map through the second terminal 120, and according to at least one embodiment, the passenger may check a moving route of the mobile vehicle.

The passenger may manipulate the second terminal 120 to check (or obtain) information about the mobile vehicle and/or about the driver, thereby checking (or determining) whether the mobile vehicle is a registered vehicle and whether the driver driving the mobile vehicle is a registered driver.

The passenger may pay the fare of the mobile vehicle after the mobile vehicle reaches the destination, but according to the system 100, the passenger may request to pay the fare of the mobile vehicle in advance even before the mobile vehicle reaches the destination. More specifically, if the passenger requests to pay the fare in advance through the second terminal 120, the second terminal 120 may display a message requesting the passenger to input card information to the card reader 140, and the passenger may input the card information to the card reader 140 by tagging or swiping a card on the card reader 140. The card reader 140 may transmit the card information to the second terminal 120, and the second terminal 120 may transmit the card information and fare information of the mobile vehicle to the card server 12 after the driving service is ended and may receive a payment authorization of the fare of the mobile vehicle.

Ending Driving Service

When the mobile vehicle reaches the destination, the driver may input to the meter 130, that the driving service has ended. The meter 130 may transmit fare data obtained based on fare calculation data (including at least one of moving distance data and moving time data of the mobile vehicle from the departure point to the destination) to the first terminal 110, and the first terminal 110 checks (or obtains) the fare data. While checking (or obtaining) the fare data, the first terminal 110 may change the fare data received from the meter 130 by considering the toll fee input by the driver while providing the driving service.

The first terminal 110 may transmit the fare data of the mobile vehicle to the second terminal 120, and the second terminal 120 may output the fare data on a screen of the second terminal 120. While outputting the fare data, the second terminal 120 may further output payment options for the fare. Examples of the payment options may include cash payment and credit card payment, although embodiments are not limited thereto.

When the passenger selects a credit card payment, the second terminal 120 may output (or display) a message requesting the passenger to input the card information to the card reader 140, and additionally may output (or display) a selection menu for a tip.

When the passenger inputs the card information to the card reader 140, the second terminal 120 receives the card information (from the card reader 140) and transmits the card information to the card server 12 to receive payment authorization of the fare. When payment normally ends, the second terminal 120 transmits a result of the payment authorization (indicating the payment normally ended) to the first terminal 110. The first terminal 110 stores information that the driving service ended and paid fare information, and the first terminal 110 may transmit such information to the center server 11 so that an income history is managed (or stored) by the center server 11.

Ending Service

If the driver wants to stop providing a driving service for awhile, the driver may select an off-duty menu so that the passenger does not get on the mobile vehicle. If the driver wants to stop driving the mobile vehicle, the driver may select a logout menu displayed on a screen of the first terminal 110.

Others

The first terminal 110 may receive a message transmitted for the driver from the center server 11, and the first terminal 110 may display the message on the screen for the driver.

The driver may check (or obtain) driving record information and income information through the first terminal 110, and the first terminal 110 may transmit the driving record information and the income information to the center server 11 so that a manager of the center server 11 may efficiently manage the mobile vehicle. The driving record information may include a departure point, a destination, a departure time, and/or an arrival time. The income information may include paid fare information of each driving service.

The second terminal 120 may operate in a disabled person mode for a person who is visually impaired, for example. The passenger may manipulate the second terminal 120 to operate in the disabled person mode. The second terminal 120 may auditorily output information related to a driving service, such as a payment, for the passenger's convenience.

Connection structures of components included in the system 100 may now be described with respect to FIGS. 2 through 5.

Figure 2:
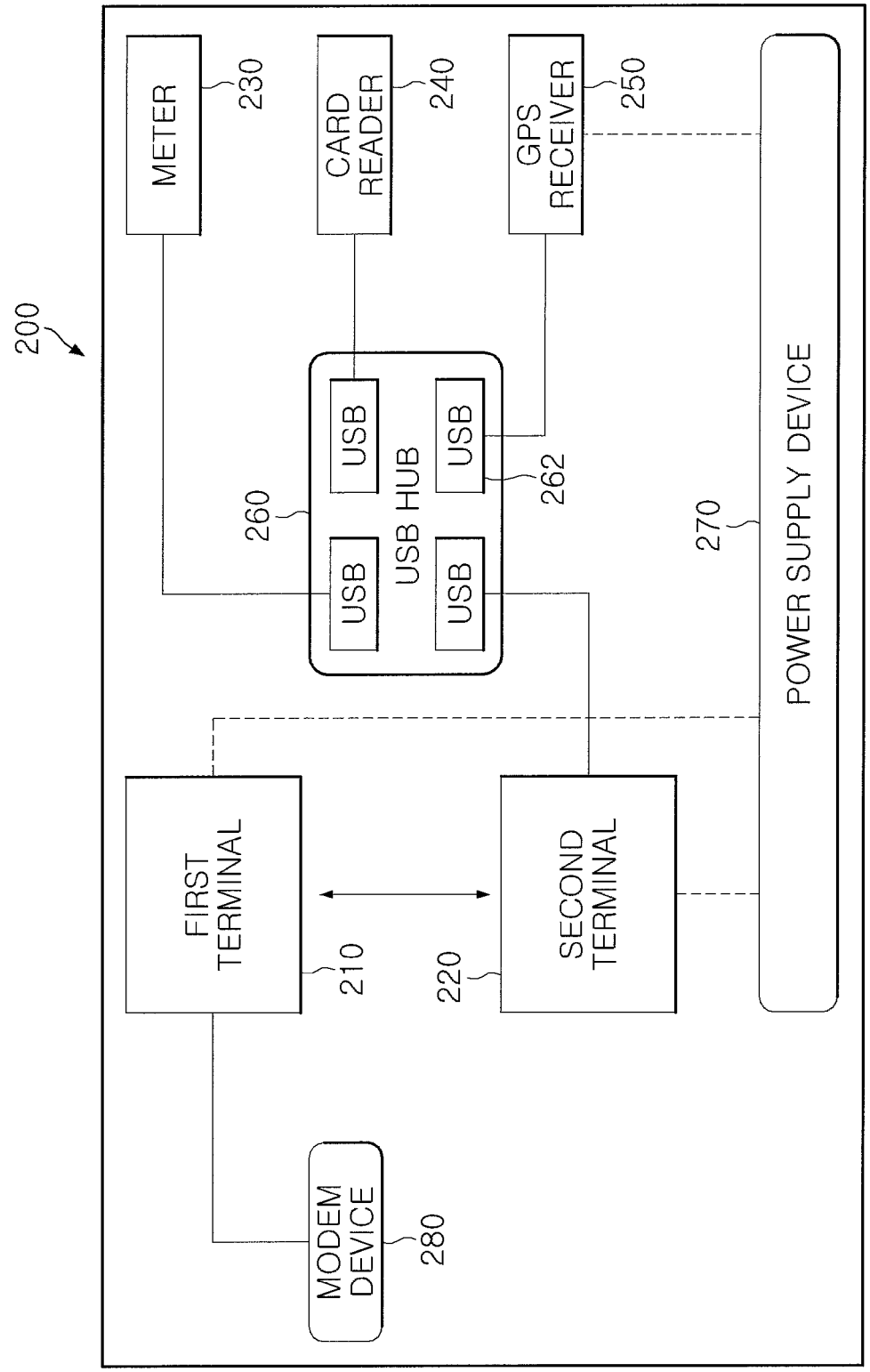
FIG. 2 is a diagram for describing a first connection relationship in a system for paying a fare of a mobile vehicle, according to an example embodiment.

FIG. 2 is a diagram for describing a first connection relationship in a system 200 for paying a fare of a mobile vehicle, according to an example embodiment. Other embodiments and configurations may also be provided.

A first terminal 210 may be connected to a modem device 280 via wires, and the first terminal 210 may be connected to the predetermined communication network 20 through the modem device 280. The modem device 280 may include a WiFi hotspot, a WiFi access point, and/or a WiFi egg, for example.

A second terminal 220 may be connected to the predetermined communication network 20 through the first terminal 210, and may be connected to the predetermined communication network 20 via a tethering connection with the first terminal 210.

At least one of a meter 230, a card reader 240, and a GPS receiver 250 may be connected to the second terminal 20 through a universal serial bus (USB) hub 260. The USB hub 260 may include a plurality of USB ports 262, and at least one of the meter 230, the card reader 240, and the GPS receiver 250 may transmit obtained data to the second terminal 220 through the USB hub 260.

The second terminal 220 may transmit, to the first terminal 210, data to be transmitted to the first terminal 210, and data to be transmitted to the card server 12 to the card server 12, from among the data received from at least one of the meter 230, the card reader 240, and the GPS receiver 250.

Dashed lines in FIG. 2 may denote paths of power, and as shown in FIG. 2, a power supply device 270 may directly supply power to the first and second terminals 210 and 220, and any one of the meter 230, the card reader 240, and the GPS receiver 250.

Figure 3:
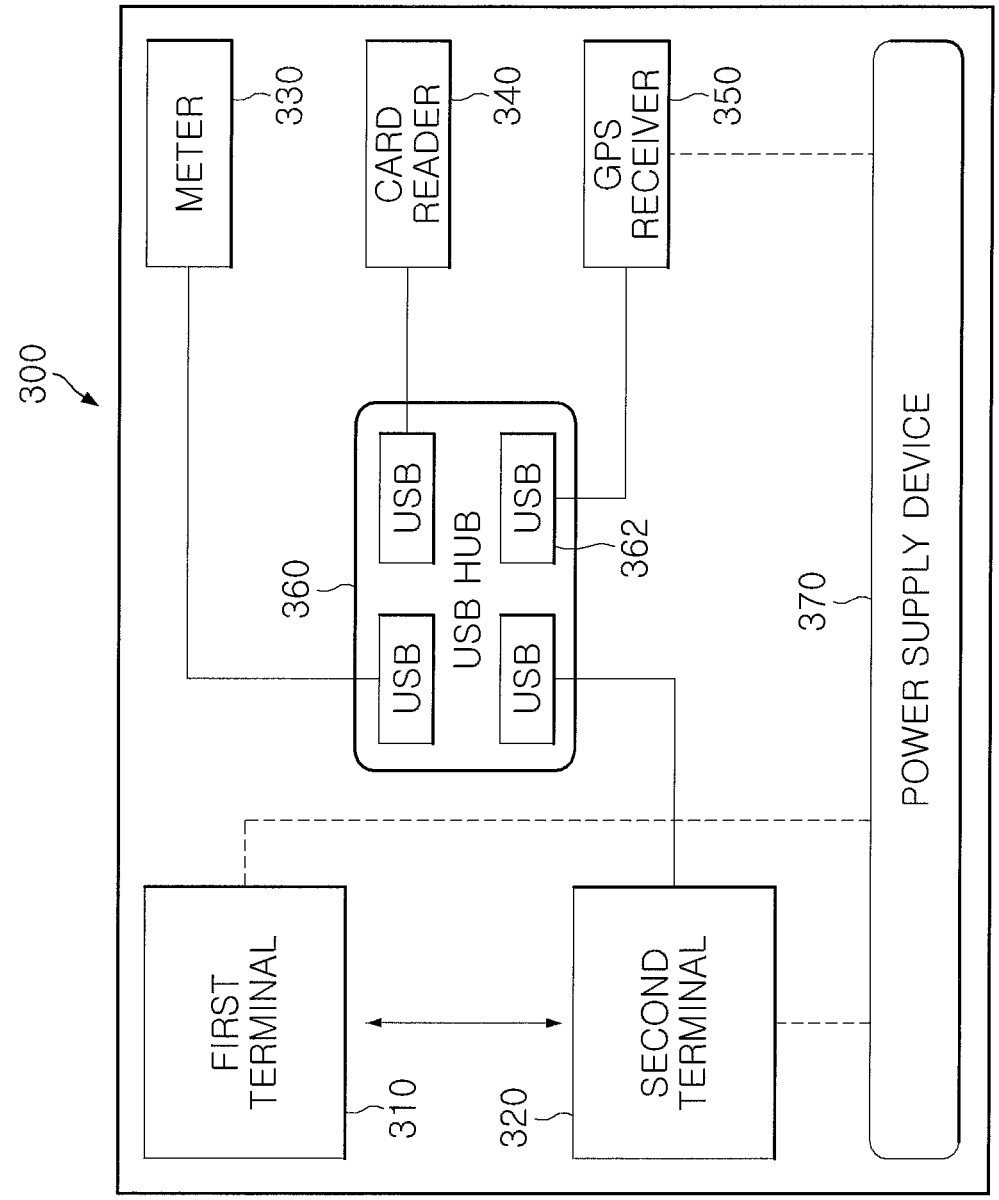
FIG. 3 is a diagram for describing a second connection relationship in a system for paying a fare of a mobile vehicle, according to an example embodiment.

FIG. 3 is a diagram for describing a second connection relationship in a system 300 for paying a fare of a mobile vehicle, according to an example embodiment. Other embodiments and configurations may also be provided.

Referring to FIG. 3, unlike the first connection relationship (of FIG. 2), the modem device 280 is not included in the second connection relationship. According to the second connection relationship, a first terminal 310 may be connected to the predetermined communication network 20 through a communication module included in the first terminal 310. The predetermined communication network 20 may be a mobile communication network provided by a mobile carrier. Examples of the mobile communication network may be a 3rd-generation (3G) network and a long-term evolution (LTE) network.

Figure 4:
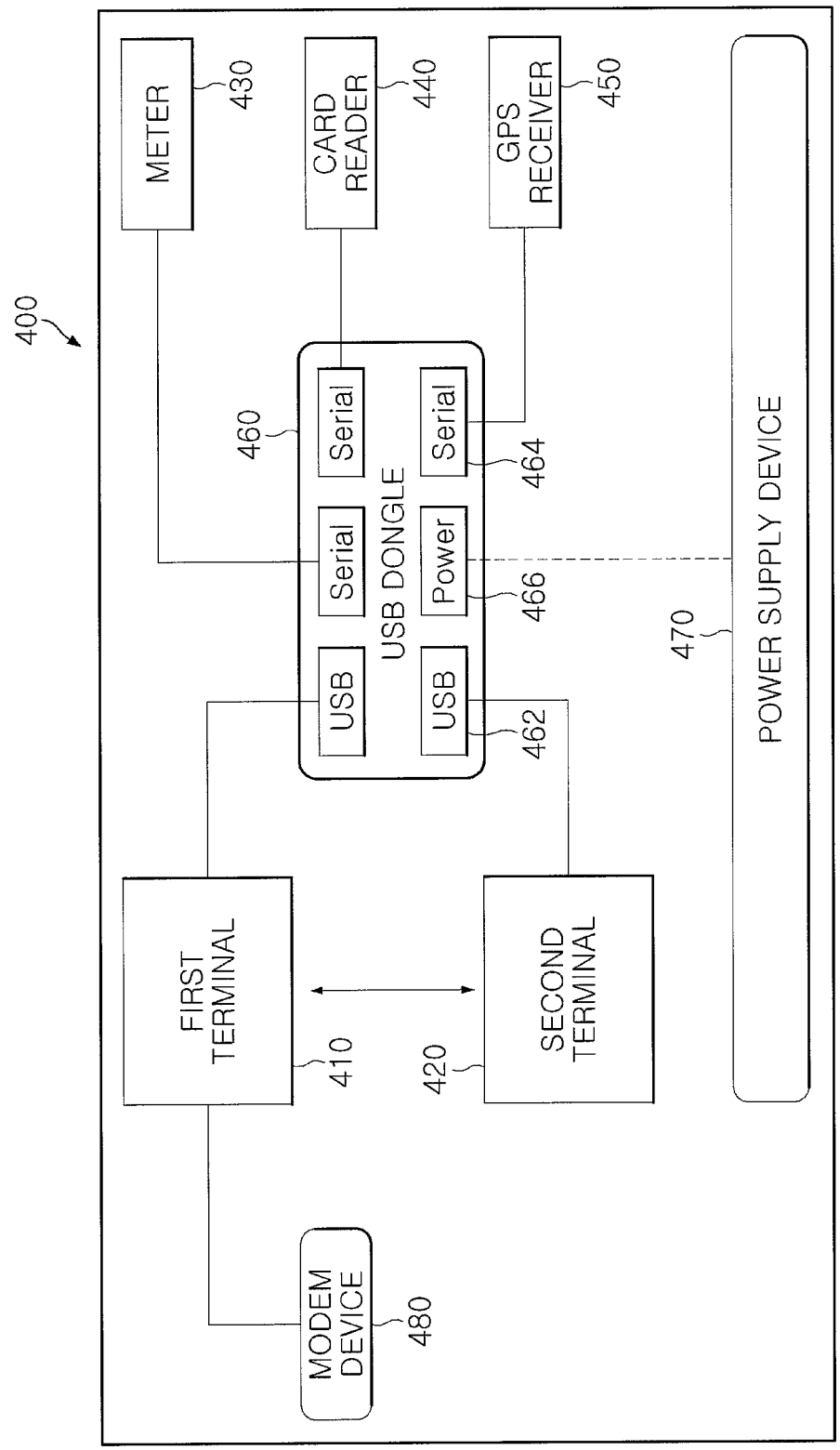
FIG. 4 is a diagram for describing a third connection relationship in a system for paying a fare of a mobile vehicle, according to an example embodiment.

FIG. 4 is a diagram for describing a third connection relationship in a system 400 for paying a fare of a mobile vehicle, according to an example embodiment. Other embodiments and configurations may also be provided.

A first terminal 410 may be connected to a modem device 480 via wires, and may be connected to the predetermined communication network 20 through the modem device 480. The modem device 480 may include a WiFi hotspot, a WiFi access point, and/or a WiFi egg.

A second terminal 420 may be connected to the predetermined communication network 20 through the first terminal 410, and the second terminal 420 may be connected to the predetermined communication network 20 via a tethering connection with the first terminal 410.

At least one of a meter 430, a card reader 440, and a GPS receiver 450 may be connected to the first and second terminals 410 and 420 through a USB dongle 460. The USB dongle 460 may include a plurality of USB ports 462 and a plurality of serial ports 464, and the first and second terminals 410 and 420 may be connected to any one of the meter 430, the card reader 440, and the GPS receiver 450 through the plurality of USB ports 462 and the plurality of the serial ports 464.

At least one of the meter 430, the card reader 440, and the GPS receiver 450 may transmit obtained data to the second terminal 420. As described above, the second terminal 420 may transmit, to the first terminal 410, data to be transmitted to the first terminal 410 and data to be transmitted to the card server 12 to the card server 12, from among the data received from at least one of the meter 430, the card reader 440, and the GPS receiver 450.

According to at least one embodiment, at least one of the meter 430, the card reader 440, and the GPS receiver 450 may transmit obtained data to the first terminal 410, and at this time, the first terminal 410 may transmit, to the second terminal, data to be transmitted to the second terminal 420 and data to be transmitted to the card server 12 to the card server 120, from among the data received from at least one of the meter 430, the card reader 440, and the GPS receiver 450.

According to at least one embodiment, at least one of the meter 430, the card reader 440, and the GPS receiver 450 may select a target (i.e., the first or second terminal 410 or 420) to receive obtained data, and then transmit the obtained data to the selected target.

A dashed line in FIG. 4 may denote a path of power, and as shown in FIG. 4, a power supply device 470 may supply power to a power port 466 of the USB dongle 460 so as to supply power to the first and second terminals 410 and 420 and to any one of the meter 430, the card reader 440, and the GPS receiver 450, through the USB dongle 460. The USB dongle 460 may be used to supply power, and may transmit and receive data.

Figure 5:
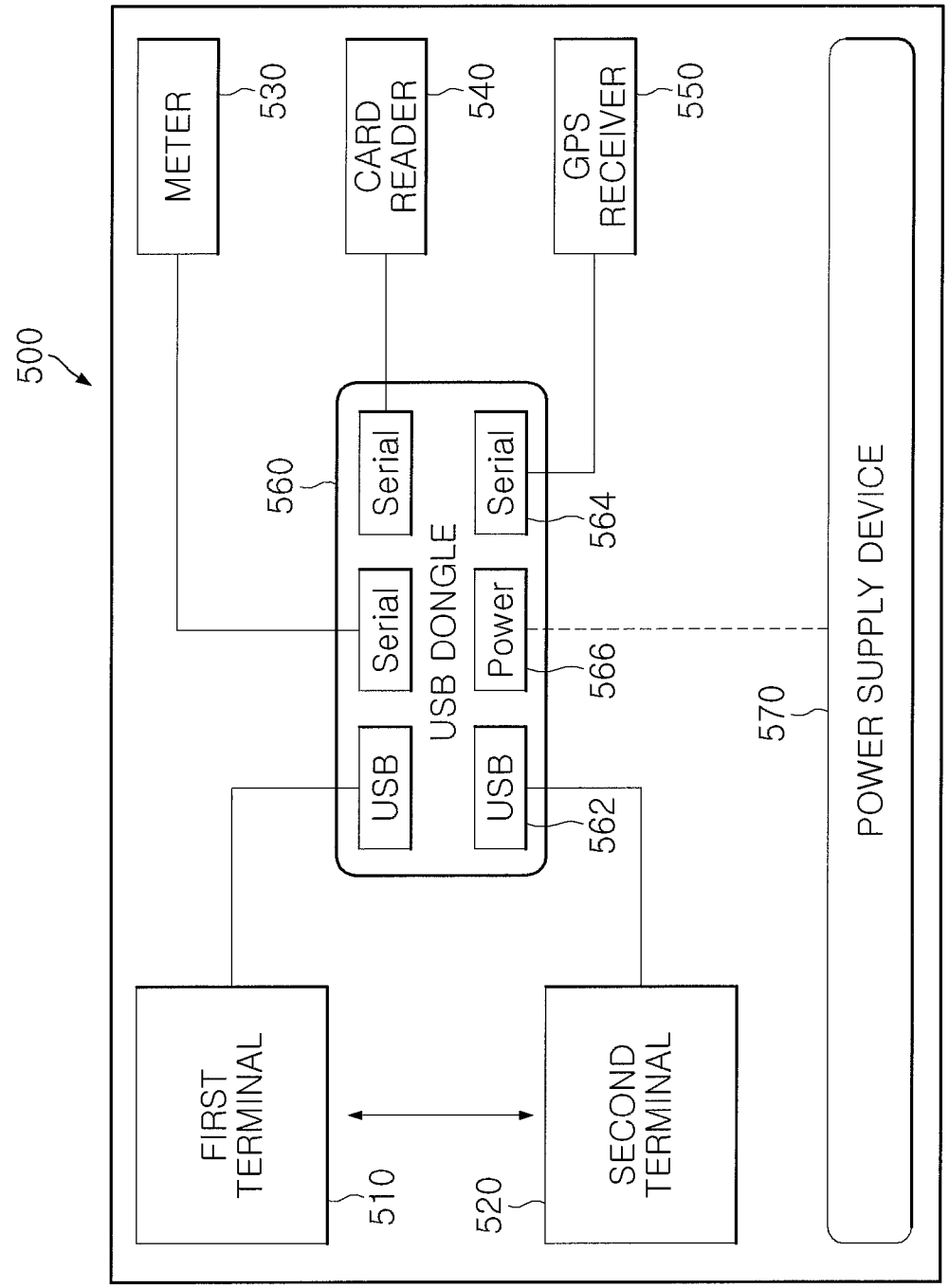
FIG. 5 is a diagram for describing a fourth connection relationship in a system for paying a fare of a mobile vehicle, according to an example embodiment.

FIG. 5 is a diagram for describing a fourth connection relationship in a system 500 for paying a fare of a mobile vehicle, according to an example embodiment. Other embodiments and configurations may also be provided.

Referring to FIG. 5, unlike the third connection relationship of FIG. 4, the modem device 480 is not included in the fourth connection relationship. According to the fourth connection relationship, a first terminal 510 may be connected to the predetermined communication network 20 through a communication module included in the first terminal 510. The predetermined communication network 20 may be a mobile communication network provided by a mobile carrier. Examples of the mobile communication network may be a 3G network and an LTE network.

According to the third and fourth connection relationships, the second terminals 420 and 520 may not be included in the systems 400 and 500. In this example, the first terminals 410 and 510 may directly receive and process data from any one of the meters 430 and 530, the card readers 440 and 540, and the GPS receivers 450 and 550.

A method of paying a fare of a mobile vehicle, where the method is performed by a system for paying a fare or by a first terminal, according to embodiments may now be described with reference to FIGS. 6 through 9.

Figure 6:
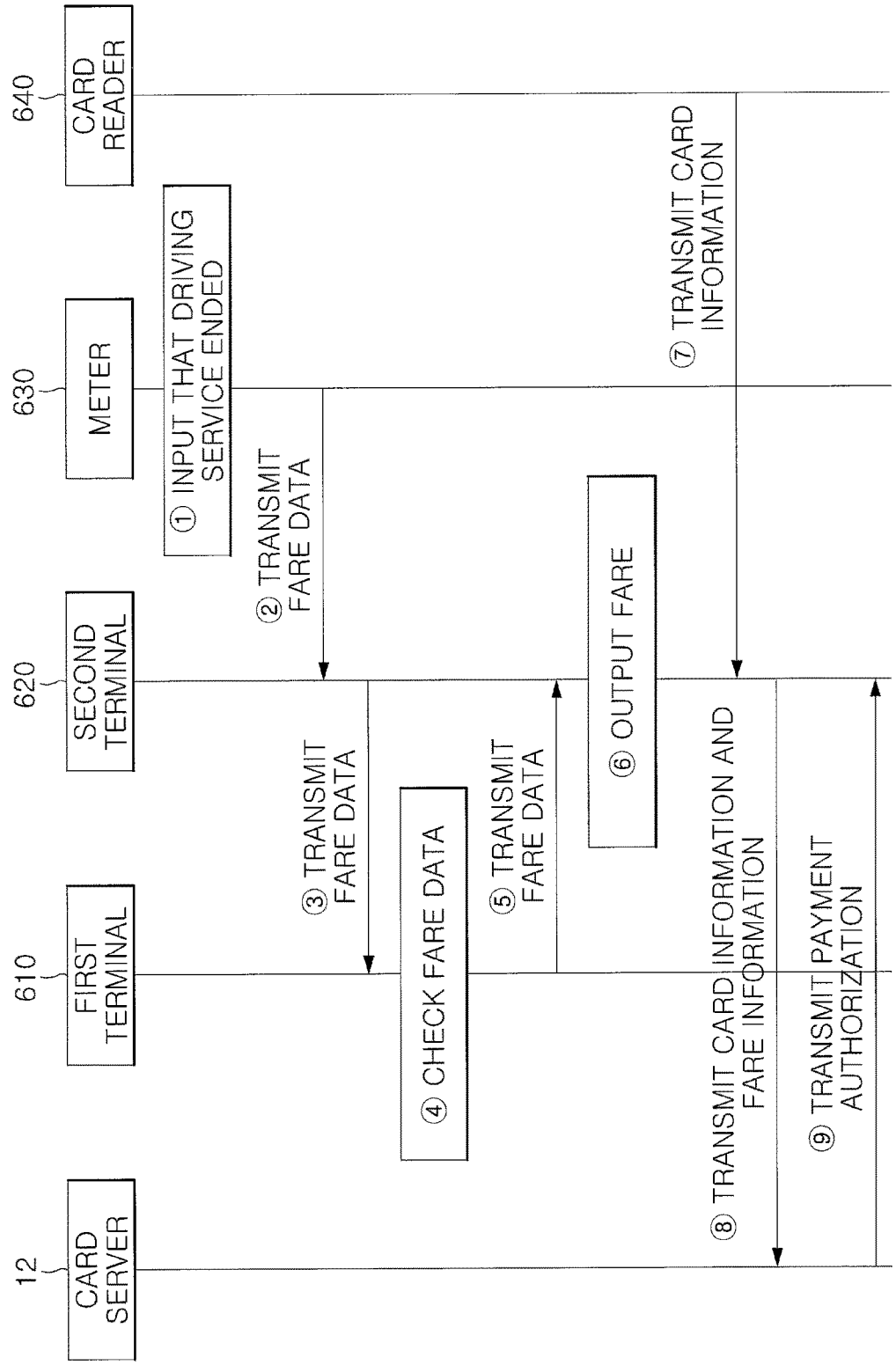
FIG. 6 is a diagram for describing a method of paying a fare of a mobile vehicle, where the method is performed by a system for paying a fare of a mobile vehicle, according to an example embodiment.

FIG. 6 is a diagram for describing a method of paying a fare of a mobile vehicle, where the method is performed by a system for paying a fare of a mobile vehicle, according to an example embodiment. The method may be performed when at least one of the meter 230 or 330, the card reader 240 or 340, and the GPS receiver 250 or 350 is connected to the second terminal 220 or 320 (as shown in FIG. 2 or FIG. 3), and when at least one of the meter 430 or 530, the card reader 440 or 540, and the GPS receiver 450 or 550 transmits data only to the second terminal 420 or 520 (as shown in FIG. 4 or FIG. 5).

First, when a mobile vehicle reaches a destination and a driving service ends, as per operation ① a driver inputs, to a meter 630, that the driving service ended.

The meter 630 obtains fare data of the mobile vehicle based on fare calculation data (including at least one of moving distance data and moving time data of the mobile vehicle), and as per operation ② transmits the obtained fare data to a second terminal 620.

As per operation ③ the second terminal 620 transmits the fare data received from the meter 620 to a first terminal 610.

As per operation ④ the first terminal 610 checks (or obtains) the fare data. While checking (or obtaining) the fare data, the first terminal 610 may further consider a toll fee input by the driver while driving the mobile vehicle.

As per operation ⑤ the first terminal 610 transmits the fare data to the second terminal 620. The first terminal 610 may output (or display) a fare of the mobile vehicle on a screen before transmitting the fare data to the second terminal 620, and/or the first terminal 610 may transmit the fare data to the second terminal 620 after receiving a check input on the fare from the driver.

As per operation ⑥ the second terminal 620 may output (or display) the fare of the mobile vehicle on a screen. While outputting the fare on the screen, the second terminal 620 may further output (or display) a tip determining menu on the screen. The second terminal 620 may output (or display), on the screen, a final fare obtained by adding a tip (determined by a passenger) and the fare of the mobile vehicle.

As per operation ⑦ when the passenger tags or swipes a credit card to a card reader 640, the card reader 640 may obtain card information of the passenger and may transmit the card information to the second terminal 620.

As per operation ⑧ if the second terminal 620 is connectable to the card server 12, the second terminal 620 may transmit the card information and fare information of the mobile vehicle to the card server 12.

If the second terminal 620 is not connectable to the card server 12, then the second terminal 620 may determine whether to store the card information and the fare information. More specifically, the second terminal 620 may determine whether to store the fare information and the card information by comparing a pre-set reference value and at least one of an amount of the fare of the mobile vehicle, a total amount of fares of the mobile vehicle (pre-stored in the second terminal 620), and a number of pieces of card information (pre-stored in the second terminal 620). For example, if the fare of the mobile vehicle is 10,000 won whereas a pre-set reference value of a fare is 5,000 won, then the second terminal 620 may not store the fare information and the card information.

If the second terminal 620 is connectable to the card server 12 after the card information and the fare data are stored based on a result of the determining by the second terminal 620, the second terminal 620 may transmit the card information and the fare information to the card server 12, and receive a payment authorization from the card server 12.

As per operation ⑨ the card server 12 may transmit the payment authorization to the second terminal 620. Upon receiving the payment authorization, the second terminal 620 may transmit a result of the payment authorization to the first terminal 610, and the first terminal 610 may transmit information that the fare of the mobile vehicle is paid to the center server 11 so that income information of the mobile vehicle is managed by the center server 11 (or stored).

Figure 7:
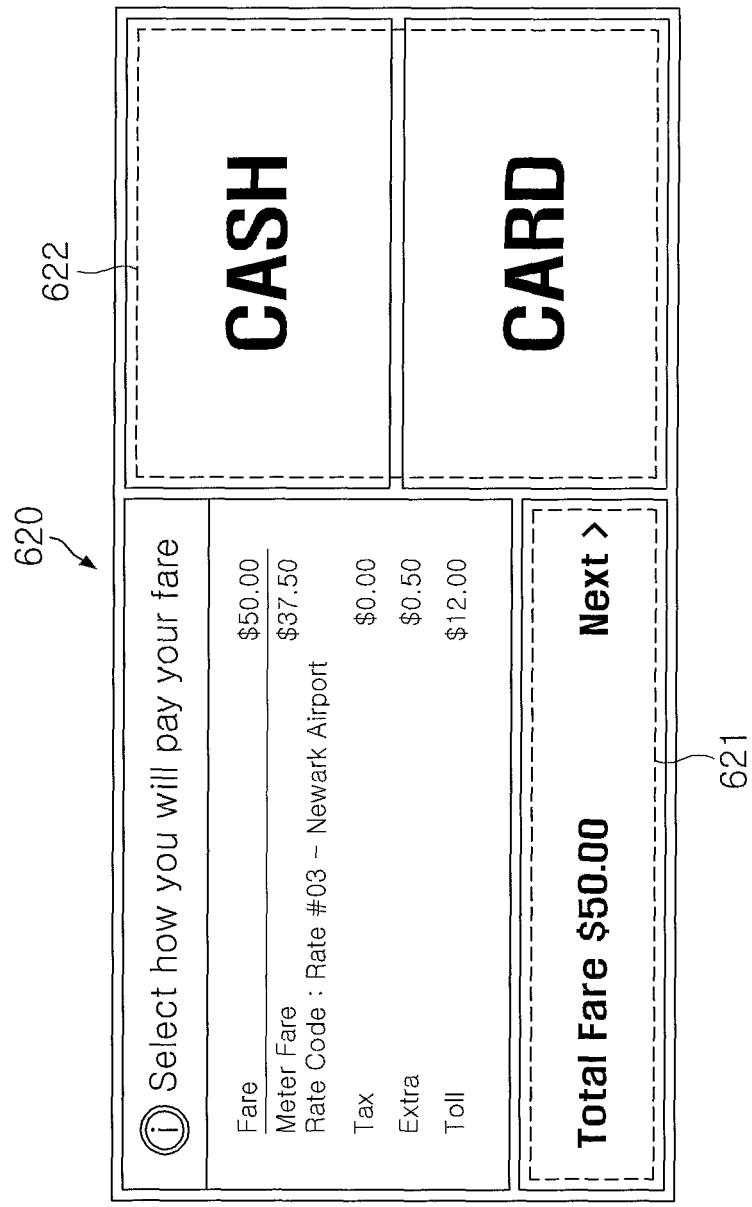
FIG. 7 is a diagram of a fare of a mobile vehicle, which is output on a screen of a second terminal, according to an example embodiment.
Figure 8:
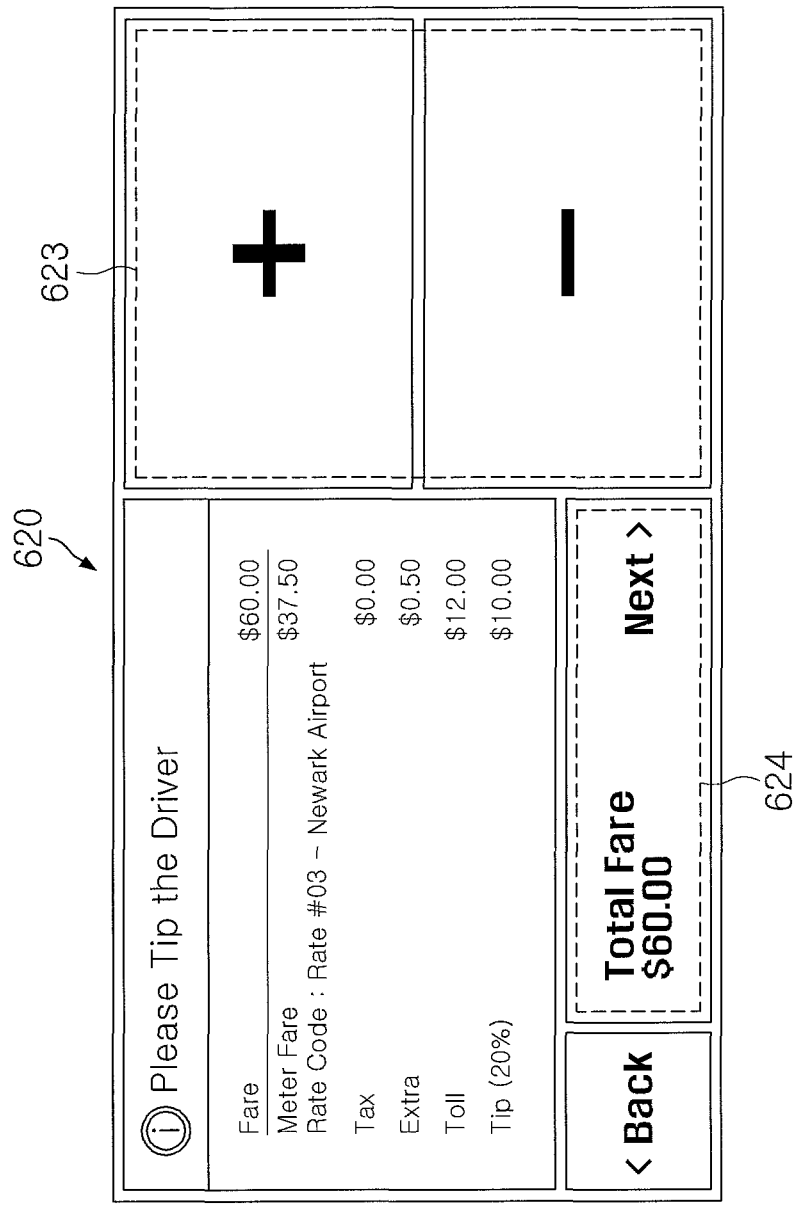
FIG. 8 is a diagram of a tip determining menu output on a screen of a second terminal, according to an example embodiment.

FIG. 7 is a diagram of a fare of the mobile vehicle, which is output on a screen of the second terminal 620, according to an example embodiment. FIG. 8 is a diagram of a tip determining menu output on a screen of the second terminal 620, according to an example embodiment. Other embodiments and configurations may also be provided.

As shown in FIG. 7, the second terminal 620 may output fare information 621 of the mobile vehicle, received from the first terminal 610, on the screen. Additionally, the second terminal 620 may output (or display) a payment option menu 622 on the screen. The passenger may determine whether to pay the fare with cash or a credit card based on the payment option menu 622.

As shown in FIG. 8, the second terminal 620 may further output a tip determining menu 623 on the screen, and may output (or display) on the screen a final fare 624 obtained by adding a tip (determined by the passenger) and the fare.

FIG. 9 is a diagram for describing a method of paying a fare of a mobile vehicle, which is performed by a first terminal 910, according to an example embodiment. Other embodiments and configurations may also be provided.

In FIG. 9, a second terminal does not exist, and at least one of a meter 930 and a card reader 940 is connected to the first terminal 910.

First, when a mobile vehicle reaches a destination and a driving service ends, as per operation ① a driver inputs, to the meter 930, that the driving service has ended.

As per operation ② the meter 930 obtains fare data of the mobile vehicle based on fare calculation data (including at least one of moving distance data and moving time data of the mobile vehicle), and transmits the fare data to the first terminal 910.

As per operation ③ the first terminal 910 may check (or obtain) the fare data of the mobile vehicle. While checking (or obtaining) the fare data, the first terminal 910 may further consider a toll fee input by the driver while driving the mobile vehicle.

As per operation ④ the first terminal 910 may output (or display) a fare of the mobile vehicle on a screen. While outputting the fare on the screen, the first terminal 910 may further output a tip determining menu on the screen. The first terminal 910 may output (or display) on the screen a final fare obtained by adding a tip (determined by a passenger) and the fare of the mobile vehicle.

As per operation ⑤ when the passenger tags or swipes a credit card to the card reader 940, the card reader 940 may obtain card information of the passenger and may transmit the card information to the first terminal 910.

As per operation ⑥ if the first terminal 910 is connectable to the card server 12, the first terminal 910 may transmit the card information and fare information of the mobile vehicle to the card server 12.

If the first terminal 910 is not connectable to the card server 12, the first terminal 910 may determine whether to store the card information and the fare information. More specifically, the first terminal 910 may determine whether to store the fare information and the card information by comparing a pre-set reference value and at least one of an amount of the fare of the mobile vehicle, a total amount of fares of the mobile vehicle (pre-stored in the first terminal 910), and a number of pieces of card information (pre-stored in the first terminal 910).

As per operation ⑦ the card server 12 may transmit a payment authorization to the first terminal 910. Upon receiving the payment authorization, the first terminal 910 may transmit information that the fare of the mobile vehicle is paid to the center server 11 so that income information of the mobile vehicle is managed by the center server 11.

A system and method of paying a fare of a mobile vehicle, according to one or more embodiments, may increase convenience of a passenger who uses the mobile vehicle.

A system and method of paying a fare of a mobile vehicle, according to one or more embodiments, may enable a mobile vehicle operating company to easily manage the mobile vehicle.

A system and method of paying a fare of a mobile vehicle, according to one or more embodiments, may efficiently connect several apparatuses (located in the mobile vehicle) to each other.

Embodiments described above may be drafted into computer-executable programs, and may be embodied within a conventional digital computer for operating the program using a computer-readable recording medium.

The computer-readable recording medium may include storage media such as a magnetic storage medium (e.g., ROMs, floppy disks, hard disks, etc.), an optically readable medium (e.g., CD ROMs, DVDs, etc.), and a carrier wave (e.g., transmission via the internet).

One or more embodiments may include a system and method of paying a fare of a mobile vehicle that increase convenience of a passenger who uses the mobile vehicle.

One or more embodiments may include a system and method of paying a fare of a mobile vehicle that enables a mobile vehicle operating company to easily manage the mobile vehicle.

One or more embodiments may include a system and method of paying a fare of a mobile vehicle that efficiently connects several apparatuses (located in the mobile vehicle) to each other.

According to one or more embodiments, a method may be provided of paying a fare of a mobile vehicle by using a first terminal and a second terminal, which are located in the mobile vehicle. The method may include: receiving, by the second terminal, fare data of the mobile vehicle, which is obtained based on fare calculation data comprising at least one of moving distance data and moving time data of the mobile vehicle, from a meter, and transmitting the received fare data to the first terminal. The method may also include transmitting, by the first terminal, the fare data to the second terminal, and receiving, by the second terminal, card information of a passenger from a card reader, transmitting the card information to a card server connected to the second terminal through a predetermined communication network, and receiving a payment authorization of a fare of the mobile vehicle from the card server.

The transmitting of the fare data to the second terminal may include: changing the fare data received from the second terminal by further considering a toll fee input by a driver while the mobile vehicle is providing a driving service, and transmitting the changed fare data to the second terminal.

The method may further include outputting, by the second terminal, the fare of the mobile vehicle on a screen based on the fare data received from the first terminal.

The outputting may include outputting, by the second terminal, a tip determining menu on the screen, and when a tip is determined by the passenger, outputting, by the second terminal, a final fare obtained by adding the determined tip and the fare of the mobile vehicle.

The receiving of the payment authorization may include: when it is impossible to connect the second terminal to the card server, determining, by the second terminal, whether to store the card information and fare information of the mobile vehicle, and when it is possible to connect the second terminal to the card server after the card information and the fare information are stored based on a result of the determining, transmitting, by the second terminal, the card information and the fare information to the card server and receiving the payment authorization from the card server.

The determining may include determining whether to store the card information and the fare information based on at least one of an amount of the fare of the mobile vehicle, a total amount of fares of the mobile vehicle, which is pre-stored in the second terminal, and a number of pieces of card information, which is pre-stored in the second terminal.

The method may further include: transmitting, by the second terminal, a result of the payment authorization to the first terminal, and transmitting, by the first terminal, information that the fare of the mobile vehicle is paid to a center server connected to the first terminal through the predetermined communication network.

The first terminal may be located at a driver region of the mobile vehicle. The second terminal may be located at a passenger region of the mobile vehicle.

The card reader may be located at a passenger region of the mobile vehicle.

According to one or more embodiments, a method may be provided of paying a fare of a mobile vehicle by using a first terminal located in the mobile vehicle. The method may include: receiving, from a meter, fare data of the mobile vehicle, which is obtained based on fare calculation data including at least one of moving distance data and moving time data of the mobile vehicle, and receiving card information of a passenger from a card reader, transmitting the card information to a card server through a predetermined communication network, and receiving a payment authorization of a fare of the mobile vehicle from the card server.

According to one or more embodiments, a system may be provided for paying a fare of a mobile vehicle. The system may include: a first terminal that is located in the mobile vehicle and communicates with an external server by being connected to a predetermined communication network, and a second terminal that is located in the mobile vehicle and connected to the predetermined communication network through the first terminal. The second terminal may receive fare data of the mobile vehicle, which is obtained based on fare calculation data including at least one of moving distance data and moving time data of the mobile vehicle, from a meter, and may transmit the received fare data to the first terminal, and the first terminal may transmit the fare data to the second terminal. The second terminal may receive card information of a passenger from a card reader, transmit the card information to a card server connected to the second terminal through the predetermined communication network, and receive a payment authorization of a fare of the mobile vehicle from the card server.

The first terminal may change the fare data received from the second terminal by further considering a toll fee input by a driver while the mobile vehicle is providing a driving service, and may transmit the changed fare data to the second terminal.

The second terminal may output the fare of the mobile vehicle on a screen based on the fare data received from the first terminal.

The second terminal may output a tip determining menu on the screen, and when a tip is determined by the passenger, the second terminal may output a final fare obtained by adding the determined tip and the fare of the mobile vehicle.

When it is impossible to connect the second terminal to the card server, the second terminal may determine whether to store the card information and fare information of the mobile vehicle. When it is possible to connect the second terminal to the card server after the card information and the fare information are stored based on a result of the determining, the second terminal may transmit the card information and the fare information to the card server and may receive the payment authorization from the card server.

The second terminal may determine whether to store the card information and the fare information based on at least one of an amount of the fare of the mobile vehicle, a total amount of fares of the mobile vehicle, which is pre-stored in the second terminal, and a number of pieces of card information, which is pre-stored in the second terminal.

The first terminal may be located at a driver region of the mobile vehicle. The second terminal may be located at a passenger region of the mobile vehicle.

The card reader may be located at a passenger region of the mobile vehicle.

The second terminal may transmit a result of the payment authorization to the first terminal. The first terminal may transmit information that the fare of the mobile vehicle is paid to a center server connected to the first terminal through the predetermined communication network.

According to one or more embodiments, a terminal device may be located in a mobile vehicle. The terminal device may include: a memory that stores at least one program, and a processor that is controlled by the at least one program to perform a method of paying a fare of a mobile vehicle. The method may include: receiving, from a meter, fare data of the mobile vehicle, which is obtained based on fare calculation data including at least one of moving distance data and moving time data of the mobile vehicle, and receiving card information of a passenger from a card reader, transmitting the card information to a card server connected to the terminal device through a predetermined communication network, and receiving a payment authorization of a fare of the mobile vehicle from the card server.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of paying a fare of a mobile vehicle by using a first terminal and a second terminal, wherein the first terminal and the second terminal being located in the mobile vehicle, the method comprising:
   determining, at a meter, fare data of the mobile vehicle, the fare data determined at the meter based on fare calculation data that includes at least one of moving distance data and moving time data of the mobile vehicle;
   directly providing, from the meter, the fare data to the second terminal;
   directly receiving, at the second terminal, the fare data determined at the meter;

transmitting, by the second terminal, the fare data to the first terminal;

transmitting, by the first terminal, the fare data to the second terminal; and receiving, by the second terminal, card information from a card reader directly connected to the second terminal, and when the second terminal can be connected to a card server connected through a communication network, transmitting the card information from the second terminal to the card server, and receiving, at the second terminal, a payment authorization of a fare from the card server.

2. The method of claim 1, wherein the transmitting of the fare data to the second terminal includes:

changing, at the first terminal, the fare data received from the second terminal based on a toll fee input while the mobile vehicle is providing a driving service; and transmitting the changed fare data from the first terminal to the second terminal.

3. The method of claim 1, further comprising outputting, by the second terminal, the fare of the mobile vehicle based on the fare data received from the first terminal.

4. The method of claim 3, wherein the outputting of the fare includes:

displaying, by the second terminal, a tip determining menu on a screen;

receiving a tip amount based on the tip determining menu; and outputting, by the second terminal, a final fare obtained by adding the determined tip amount and the fare of the mobile vehicle.

5. The method of claim 1, wherein the receiving, at the second terminal, of the payment authorization includes:

when the second terminal can not be connected to the card server, determining, by the second terminal, whether to store the card information and fare information of the mobile vehicle; and when the second terminal can be connected to the card server after the card information and the fare information are stored based on a result of the determining, transmitting, by the second terminal, the card information and the fare information to the card server and receiving the payment authorization from the card server.

6. The method of claim 5, wherein the determining whether to store includes determining whether to store the card information and the fare information based on at least one of:

an amount of the fare of the mobile vehicle, a total amount of fares of the mobile vehicle, stored in the second terminal, and a total number of pieces of card information, stored in the second terminal.

7. The method of claim 1, further comprising:

transmitting, by the second terminal, a result of the payment authorization to the first terminal; and transmitting, by the first terminal, information of a paid fare to a center server connected to the first terminal through the communication network.

8. A system for paying a fare of a mobile vehicle, the system comprising:

a first terminal, at the mobile vehicle, to communicate with an external server via a communication network; and a second terminal, at the mobile vehicle, to connect to the communication network via the first terminal, wherein the second terminal directly receives fare data of the mobile vehicle from a meter, the fare data obtained based on fare calculation data that includes at least one of moving distance data and moving time data of the mobile vehicle, from the meter, and the second terminal transmits, to the first terminal, the received fare data, the first terminal transmits, to the second terminal, the fare data, and the second terminal receives, from a card reader directly connected to the second terminal, card information, and the second terminal transmits the card information to a card server connected to the second terminal through the communication network, and the second terminal receives, from the card server, a payment authorization of a fare of the mobile vehicle.

9. The system of claim 8, wherein the first terminal changes the fare data received from the second terminal based on a toll fee input while the mobile vehicle is providing a driving service, and the first terminal transmits the changed fare data from the first terminal to the second terminal.

10. The system of claim 8, wherein the second terminal outputs the fare of the mobile vehicle based on the fare data received from the first terminal.

11. The system of claim 10, wherein the second terminal displays a tip determining menu on a screen, receives a tip amount based on the tip determining menu, and outputs a final fare obtained by adding the determined tip amount and the fare of the mobile vehicle.

12. The system of claim 8, wherein when the second terminal can not be connected to the card server, the second terminal determines whether to store the card information and fare information of the mobile vehicle, and when the second terminal can be connected to the card server after the card information and the fare information are stored based on a result of the determining, the second terminal transmits the card information and the fare information to the card server and receives the payment authorization from the card server.

13. The system of claim 12, wherein the second terminal determines whether to store the card information and the fare information based on at least one of:

an amount of the fare of the mobile vehicle, a total amount of fares of the mobile vehicle, stored in the second terminal, and a number of pieces of card information, stored in the second terminal.

14. The system of claim 8, wherein the first terminal is provided at a driver region of the mobile vehicle, and the second terminal is provided at a passenger region of the mobile vehicle.

15. The system of claim 8, wherein the card reader is provided at a passenger region of the mobile vehicle.

16. The system of claim 8, wherein the second terminal transmits a result of the payment authorization to the first terminal, and the first terminal transmits information of a paid fare to a center server connected to the first terminal through the communication network.

* * * * *